(12) United States Patent
Burns

(10) Patent No.: US 11,778,130 B1
(45) Date of Patent: Oct. 3, 2023

(54) REVERSIBLE DIGITAL MIRROR

(71) Applicant: Zachary Burns, New York, NY (US)

(72) Inventor: Zachary Burns, New York, NY (US)

( * ) Notice: Subject to any disclaimer, the term of this patent is extended or adjusted under 35 U.S.C. 154(b) by 0 days.

(21) Appl. No.: 18/098,327

(22) Filed: Jan. 18, 2023

(51) Int. Cl.
| | |
|---|---|
| *H04N 5/262* | (2006.01) |
| *H04N 23/695* | (2023.01) |
| *G06V 40/16* | (2022.01) |
| *G06T 7/20* | (2017.01) |
| *G06V 10/26* | (2022.01) |
| *H04N 23/62* | (2023.01) |
| *G06T 7/60* | (2017.01) |

(52) U.S. Cl.
CPC .......... *H04N 5/2628* (2013.01); *G06T 7/20* (2013.01); *G06T 7/60* (2013.01); *G06V 10/26* (2022.01); *G06V 40/171* (2022.01); *H04N 23/62* (2023.01); *H04N 23/695* (2023.01); *G06T 2207/20021* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 10,607,347 B1* | 3/2020 | Poliakov | .............. | G06T 7/11 |
| 11,371,692 B2 | 6/2022 | Yang et al. | | |
| 2007/0040033 A1* | 2/2007 | Rosenberg | ........... | G06F 3/0481 |
| | | | | 235/462.36 |
| 2018/0220080 A1* | 8/2018 | Mojaver | ............... | H04N 23/60 |
| 2018/0270410 A1 | 9/2018 | Lyle et al. | | |
| 2019/0018486 A1* | 1/2019 | Benford | ................. | G06F 3/017 |
| 2022/0006950 A1* | 1/2022 | Wang | .................. | G06V 10/443 |

FOREIGN PATENT DOCUMENTS

| | | | |
|---|---|---|---|
| CN | 113630485 A | | 11/2021 |
| JP | 2012060547 A | * | 3/2012 |

OTHER PUBLICATIONS

Brad Stephenson, "How to Mirror or Flip an Image on the iPhone", Lifewire Tech for Humans Newsletter, https://www.lifewire.com/mirror-image-on-iphone-4580247, pp. 1-13, Jan. 15, 2022.

Lauren Wadowsky, "Check out the best smart mirrors you can actually buy for your home", Daily Digest, https://thegadgetflow.com/blog/check-out-best-smart-mirrors-you-can-actually-buy-home/, pp. 1-22, Jun. 10, 2022.

* cited by examiner

*Primary Examiner* — James M Anderson, II
(74) *Attorney, Agent, or Firm* — Carter, DeLuca & Farrell LLP; George Likourezos

(57) ABSTRACT

An apparatus for selectively displaying a reverse image of a user includes a screen configured to display images, an imaging device hidden behind the screen, a processor, and a memory. The memory includes instructions stored thereon which, when executed by the processor, cause the apparatus to capture the first image of a user, determine an eye-level height of the user based on the captured first image, move the imaging device to the determined eye-level height of the user, capture a second image of the user at the eye-level height of the user, render a mirrored image of the second image based on the vertical axis of the imaging device, and display the rendered mirrored image on the screen.

19 Claims, 3 Drawing Sheets

REVERSIBLE DIGITAL MIRROR

TECHNICAL FIELD

The present disclosure relates generally to the field of mirrors, and more particularly, to a reversible digital mirror.

BACKGROUND

Mirrors are smooth surfaces which reflect light energy, usually constructed from clear glass coated on one side with a thin film of metal. When an object or user is placed in front of a mirror, light rays hit the mirror and bounce back in a single direction, resulting in a front-to-back inverted image of the object or user. Handheld devices, like smart phones, have allowed users to virtually view their reflections as if they were looking in a conventional mirror, and have also provided users with the ability to flip these images to see how they are viewed by the outside world. However, there is currently no full-size means for a user to view themselves in a non-inverted manner.

Accordingly, there is interest in an apparatus and method for allowing a user to view themselves in a non-inverted manner.

SUMMARY

This disclosure is directed to an apparatus and method for selectively displaying a reverse image of a user.

An aspect of the present disclosure provides an apparatus for selectively displaying a reverse image of a user. The apparatus includes a screen configured to display images, an imaging device hidden behind the screen, a processor, and a memory. The memory includes instructions stored thereon which, when executed by the processor, cause the apparatus to capture a first image of the user, determine an eye-level height of the user based on the captured first image, move the imaging device to the determined eye-level height of the user, capture a second image of the user at the eye-level height of the user, render a mirrored image of the second image based on a vertical axis of the imaging device, and display the rendered mirrored image on the screen.

In an aspect of the present disclosure, the instructions, when executed by the processor, may cause the apparatus to track the eye-level of the user in real time.

In an aspect of the present disclosure the instructions, when executed by the processor, may cause the apparatus to segment the first captured image, detect a facial landmark of the user in the captured first image based on the segmentation, identify one or more eyes in the first captured image based on the detected facial landmark, and determine the eye-level height of the user based on the identified one or more eyes.

In a further aspect of the present disclosure, the instructions, upon receiving an input, may cause the rendered mirrored image to flip along the vertical axis of the imaging device in response to the input.

In an aspect of the present disclosure, the apparatus may further include a movement mechanism including a track configured to guide movement of the imaging device, a gear configured to rotate, and a belt configured to mate with the gear and to move the imaging device along the track based on the rotation of the gear.

In an aspect of the present disclosure, the screen may be a full body length.

In an aspect of the present disclosure, the imaging device may be configured to rotate.

In an aspect of the present disclosure, the imaging device may be configured to zoom in and zoom out.

In an aspect of the present disclosure, the screen may include a touchscreen.

An aspect of the present disclosure provides a computer-implemented method for selectively displaying a reverse image of a user. The computer-implemented method includes capturing a first image of a user with an imaging device located behind a screen of a mirror device, determining an eye-level height of the user based on the captured first image, moving the imaging device to the determined eye-level height of the user, capturing a second image of the user at the eye-level height of the user, rendering a mirrored image of the second image based on a vertical axis of the imaging device, and displaying the rendered mirrored image on the screen.

In an aspect of the present disclosure, the computer-implemented method may further include tracking the eye-level height of the user in real time and moving the imaging device to a position based on the tracked real-time eye-level height.

In an aspect of the present disclosure, the computer-implemented method may further include segmenting the first captured image, detecting a facial landmark of the user in the captured first image based on the segmentation, identifying one or more eyes in the first captured image based on the detected facial landmark, and determining the eye-level height of the user based on the identified one or more eyes.

In an aspect of the present disclosure, the computer-implemented method may further include receiving an input via a touch screen of the screen and flipping the rendered mirrored image along the vertical axis of the imaging device in response to the input.

In an aspect of the present disclosure, the computer-implemented method may further include rotating a gear configured to mate with a belt of the mirror device, moving the belt in response to rotating the gear, moving the imaging device based on the movement of the belt, and guiding the movement of the imaging device along a track of the mirror device.

In an aspect of the present disclosure, the computer-implemented method may further include receiving an input and adjusting a magnification of the imaging device in response to the input.

An aspect of the present disclosure provides a non-transitory computer-readable medium storing instructions which, when executed by a processor, cause the processor to perform a computer-implemented method for selectively displaying a reverse image of a user, including capturing a first image of a user with an imaging device located behind a screen of a mirror device, determining an eye-level height of the user based on the captured first image, moving the imaging device to the determined eye-level height of the user, capturing a second image of the user at the eye-level height of the user, rendering a mirrored image of the second image based on a vertical axis of the imaging device, and displaying the rendered mirrored image on a screen.

In an aspect of the present disclosure, the computer-implemented method of the non-transitory computer-readable medium may further include tracking the eye-level height of the user in real time.

In an aspect of the present disclosure, the computer-implemented method of the non-transitory computer-readable medium may further include segmenting the first captured image, detecting a facial landmark of the user in the captured first image based on the segmentation, identifying one or more eyes in the first captured image based on the detected facial landmark, and determining the eye-level height of the user based on the identified one or more eyes.

In an aspect of the present disclosure, the computer-implemented method of the non-transitory computer-readable medium may further include receiving an input and flipping the rendered mirrored image along the vertical axis of the imaging device in response to the input.

In an aspect of the present disclosure, the computer-implemented method of the non-transitory computer-readable medium may further include rotating a gear configured to mate with a belt of the mirror device, moving the belt in response to rotating the gear, moving the imaging device based on the movement of the belt, and guiding the movement of the imaging device along a track of the mirror device.

Further details and aspects of the present disclosure are described in more detail below with reference to the appended drawings.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1A:
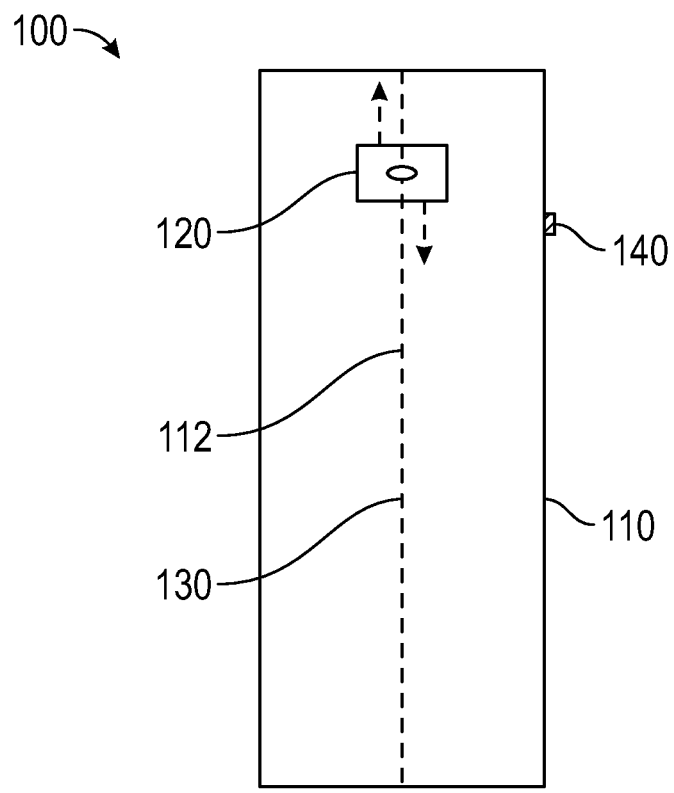
FIG. 1A is a front view of the apparatus, in accordance with aspects of the present disclosure.

The present disclosure relates generally to the field of mirrors. More specifically, an aspect of the present disclosure provides a reversible digital mirror.

Aspects of the present disclosure are described in detail with reference to the drawings wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein, and any additional applications of the principles of the present disclosure as illustrated herein, which would occur to one skilled in the relevant art and having possession of this disclosure, are to be considered within the scope of the present disclosure. For illustrative purposes, the following detailed description is directed to mirror devices, however, other devices capable of selectively displaying a reverse image of a user are within the scope of the present disclosure as well.

Figure 1B:
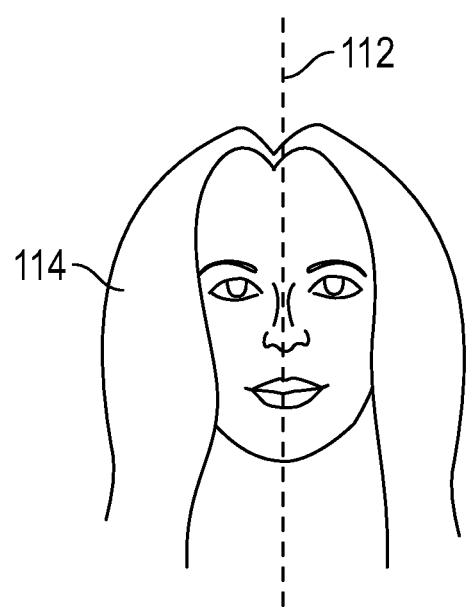
FIG. 1B is a front view of the user, including a representation of a vertical line of symmetry, in accordance with aspects of the present disclosure.
Figure 2:
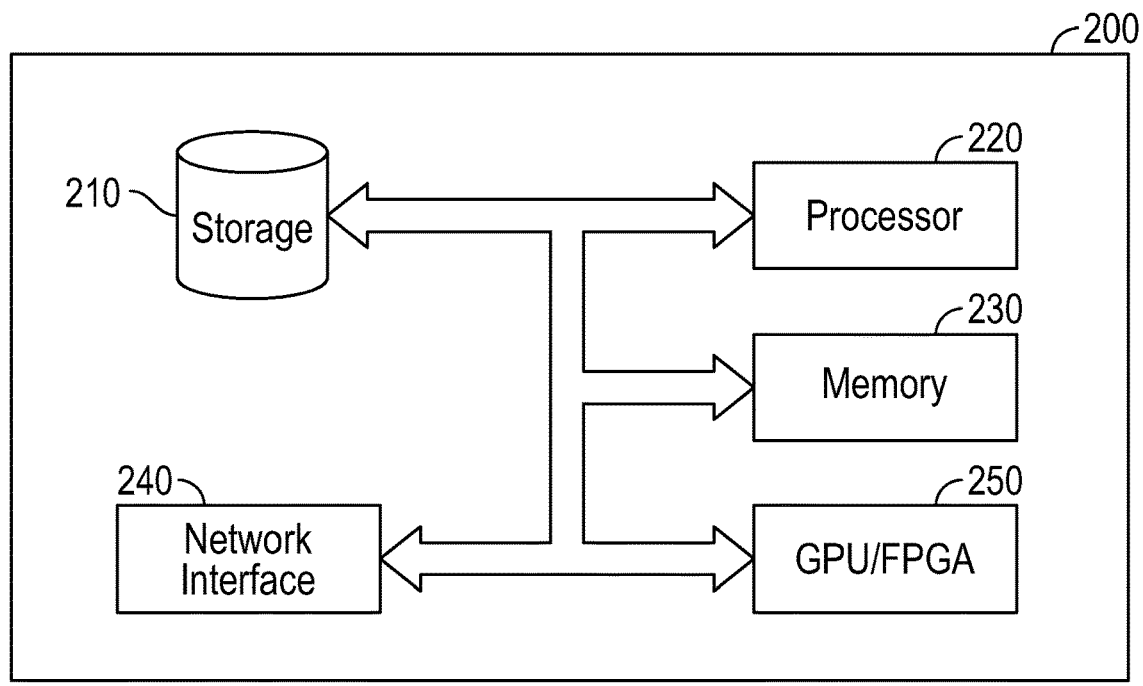
FIG. 2 is a block diagram of a controller configured for use with the apparatus of FIG. 1A, in accordance with aspects of the present disclosure.

Referring to FIGS. 1A and 1B, a digital reversible mirror 100 configured for selectively displaying a reverse image of a user 114 is shown. The digital reversible mirror 100 generally includes a screen 110 configured to display images, an imaging device 120 hidden from the user 114 behind the screen 110, and a controller 200 (FIG. 2).

The imaging device 120 is configured to capture images of the user 114 and/or an object and the surrounding area. The imaging device 120 may be a digital camera, camcorder, imaging sensor and/or other suitable device for capturing images of the user 114. These images may be still images and/or video, and may be captured continuously in real time. The imaging device 120 may be configured to rotate and/or zoom in and zoom out to capture different perspectives of a user 114. At an initial position, the controller 200 causes the imaging device 120 to capture a first image of the user 114. The controller 200 then determines an eye-level height of the user 114 based on the captured first image. The eye-level height of the user 114 may be determined by facial recognition software and/or any other suitable means of analyzing the captured first image. For example, the eye-level height may be determined by the controller 200 first segmenting the captured first image, or dividing the captured first image into unique regions for analysis. The controller 200 may then detect a facial landmark of the user 114 based on the resulting segmentation of the captured first image, and may identify one or more eyes based on the detected facial landmark, resulting in a determination of the eye-level height of the user 114. The controller 200 may also cause the eye-level height of the user 114 to be tracked in real time.

Once the eye-level height of the user 114 is determined, the controller 200 then causes the imaging device 120 to move to a second position to capture a second image of the user 114 at the determined eye-level height of the user 114. The imaging device 120 may be moved along a track 130, also hidden behind the screen 110. As shown in FIG. 1A, the imaging device 120 and track 130 may be disposed along a vertical axis of the screen 110. The track 130 may be configured to lay horizontally, vertically, or at an angle behind the screen 110. In aspects, the track 130 may be movable and/or rotatable, allowing the imaging device 120 to move horizontally, vertically, and/or diagonally. To enhance facial recognition properties of the mirror device 100 and enable faster capturing of the second image, the imaging device 120 may be part of an array of imaging devices 120. The array of imaging devices 120 may be embedded behind the screen 110, may include multiple imaging devices 120 each disposed on a separate track 130, and/or may be arranged in another manner suitable for increasing speed of capturing the second image. For example, the screen 110 may be split into quadrants, each quadrant of the screen 110 including an imaging device 120. The controller may then cause the imaging device 120 of the quadrant in closest proximity to the determined eye-level and/or facial landmark of the user 114 to move to the determined eye-level height of the user 114 and capture the second image of the user 114. Use of multiple imaging devices 120 may be contemplated to allow the mirror device 100 to more instantaneously follow a location of the user 114.

The controller 200 then causes the captured second image to be flipped across a vertical line of symmetry 112, creating a rendered mirrored image. The vertical line of symmetry 112 may be equivalent to a vertical axis of the imaging device 120. Optionally, based on the second captured image, the controller 200 may determine the vertical line of symmetry 112 based on the user's 114 face. Similar to the determination of the eye-level height of the user 114, this may be accomplished using facial recognition or any other suitable means. In aspects, the controller 200 may cause the imaging device 120 to move to a location such that the vertical axis of the imaging device 120 and the vertical line of symmetry 112 of the user's 114 face are aligned. The controller 200 may then cause the captured second image to be flipped across the vertical line of symmetry 112 of the user's 114 face, creating a rendered mirrored image particular to a location of the user 114.

The controller 200 then communicates the rendered mirrored image to the screen 110, causing the rendered mirrored image to be displayed on the screen 110. The rendered mirrored image may be generated automatically by the controller 200 or may result from an input by the user 114, such as through use of a button 140. The button 140 may be push-button, a switch, integrated into the screen 110 such as through a touchscreen, or another appropriate mechanism. The screen 110 may be sized to display a full-sized image of the full body length of the user 114. Alternatively, the screen 110 may be sized to display a full-sized image of a desired portion of the user 114 less than the full body length of the user 114. As will be appreciated, a zoom feature of the imaging device 120 may result in an enlarged or reduced size image of the user 114. In aspects, the screen 110 may be a touchscreen. The screen 110 may include one or more mounting holes, a stand, and/or any other acceptable means of securing the screen 110 in an upright position.

In aspects, the mirror device 100 may include a plurality of screens 110, where one or more of the plurality of screens 110 may include an imaging device 120, to allow images of the user 114 to be captured at multiple angles. The plurality of screens 110 may each be fixed adjacent to or at a distance from one another, and/or may be individually angled. The plurality of screens 110 may be movable relative to one another by any suitable means, for example, distanced from each other by means of a sliding track and/or angled toward or away from each other by means of a hinge. For example, a tri-fold configuration of the mirror device 100 may be formed by three screens 110 connected by hinges, and the left-most screen 110 and right-most screen 110 may each be disposed at a variable angle relative to the center screen 110. The tri-fold version of the mirror device 100 may allow the user 114 to view multiple angles of the side and/or back of the user's 114 head. The user 114 may be able to selectively reverse the image shown on each of the screens 110 for ease of use.

In aspects, the mirror device 100 may utilize Ethernet, WiFi, Internet Protocol, Bluetooth, 4G, and/or 5G, among other communication technologies. It is contemplated that the controller 200 may store and save captured images of the user 114, allowing the user 114 to share the captured images, for example, between devices and/or on social media. The mirror device 100 may support software applications. For instance, a portion of the screen 110 of the mirror device 100 may display applications such as a schedule or calendar of the user 114, weather local to the user 114, and/or any other suitable applications. In aspects, the mirror device 100 may include additional apparatuses such as microphones and/or speakers to allow the user to record and/or listen to audio, respectively.

FIG. 2 illustrates controller 200 includes a processor 220 connected to a computer-readable storage medium or a memory 230. The controller 200 may be used to control and/or execute operations of the system 100. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data. The disclosed method may run on the controller 200 or on a user device, including, for example, on a mobile device, an IoT device, or a server system.

Figure 3:
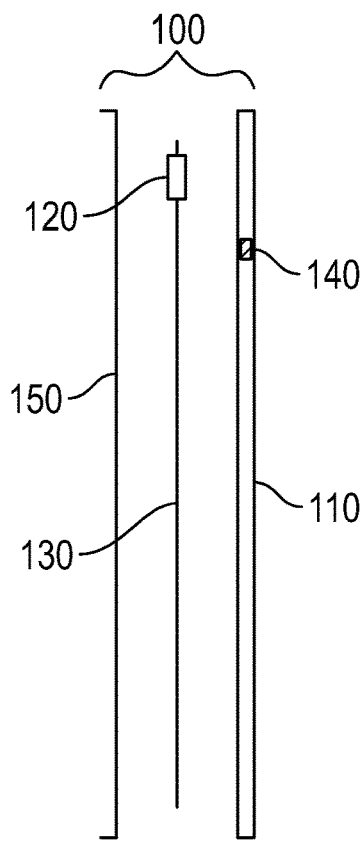
FIG. 3 provides an exploded side view of the apparatus, in accordance with aspects of the present disclosure.

FIG. 3 shows an exploded side view of digital reversible mirror 100, with the imaging device 120, track 130, and other inner workings encased by the screen 110 and a rear housing 150.

Figure 4:
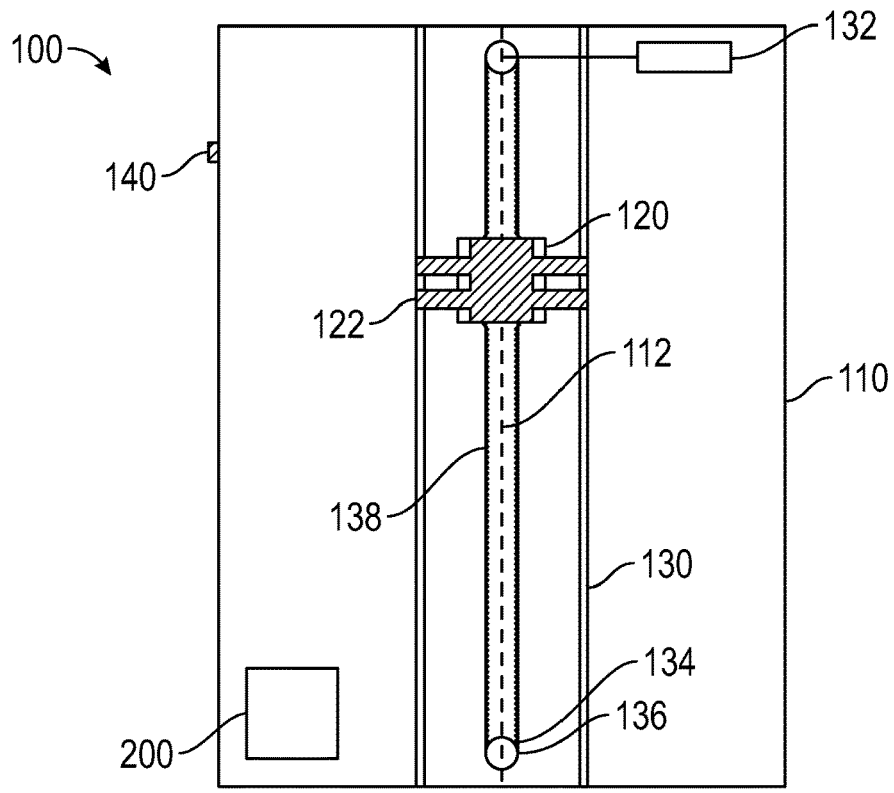
FIG. 4 provides a back view of the apparatus, in accordance with aspects of the present disclosure.

FIG. 4 shows a potential layout of the back interior of digital reversible mirror 100. To better show the inner mechanisms of digital reversible mirror 100, FIG. 4 omits the rear housing 150. In aspects, the controller 200 may be mounted behind the screen 110. The digital reversible mirror may include a movement mechanism for imaging device 120, including the track 130 as well as a mount 122 for the imaging device 120 and a means for moving the mount 122 along the track 130. The track 130 may be disposed behind the screen 130. The imaging device 120 may be attached to the mount 122 via any suitable method, such as threading, magnetics, snap-fit, fastening, and/or another suitable technique for joining components.

In aspects, the means for moving the mount 122 and imaging device 120 may be a belt 138 or other similar component configured to mate with a gear 136. The gear 136 may be disposed proximate to the end of the track 130. Other acceptable means of moving the mount 122 along the track 130 may be implemented in place of the gear 136 and belt 138, such as a ball screw system or a pulley system. A power supply 132 may provide energy to a motor 134 or other suitable device for rotating the gear 136. The rotation of the gear 136 may translate into movement of the belt 138, and the mount 122 may attach to the belt 138 such that movement of the belt 138 results in movement of the mount 122 and imaging device 120 as well. The track 130 may be used to ensure that the mount 122 and imaging device 120 move steadily in a linear direction along the track 130.

Figure 5:
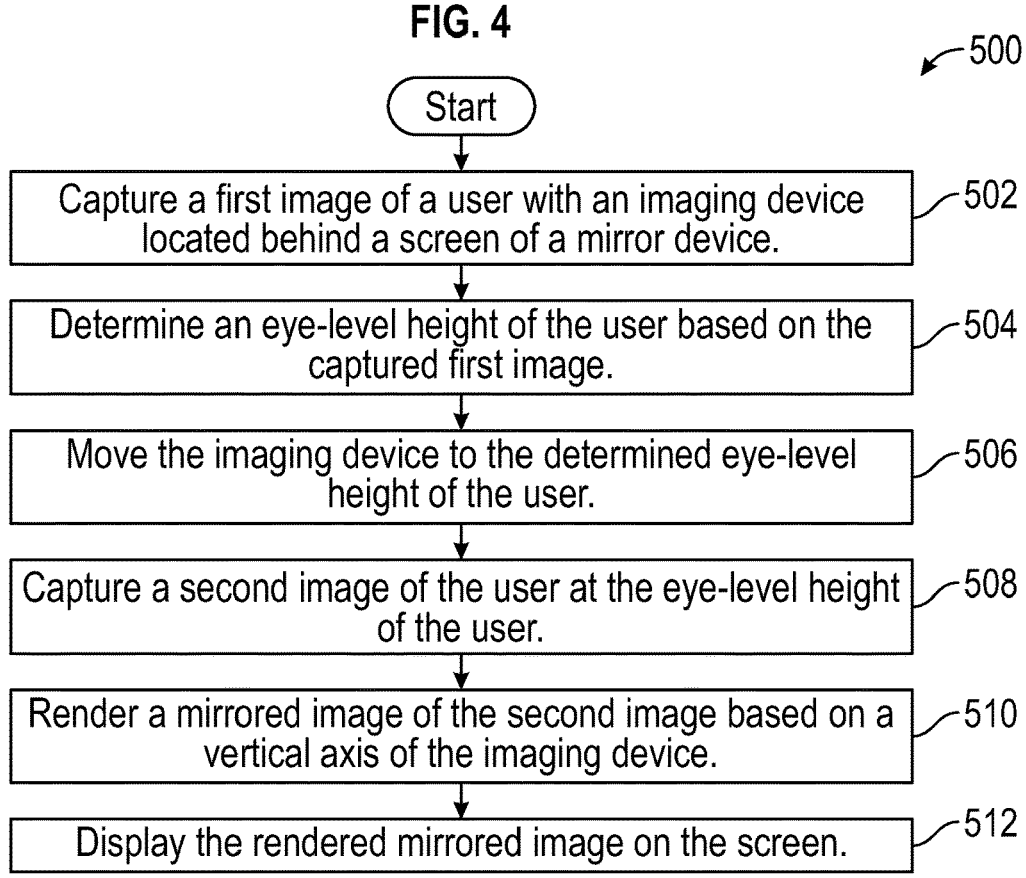
FIG. 5 is a flow diagram of a computer-implemented method for selectively displaying a reverse image of a user, in accordance with aspects of the present disclosure.

Referring to FIG. 5, a flow diagram for a method 500 of selectively displaying a reverse image of a user in accordance with the present disclosure is shown. Although the steps of FIG. 5 are shown in a particular order, the steps need not all be performed in the specified order, and certain steps can be performed in another order. For example, FIG. 5 will be described below, with a controller 200 of FIG. 2 performing the operations. In aspects, the operations of FIG. 5 may be performed all or in part by another device, for example, a server, a mobile device, such as a smartphone, and/or a computer system. These variations are contemplated to be within the scope of the present disclosure.

Initially, at step 502, the controller 200 causes the imaging device 120, while in a first position, to capture a first image of a user 114. The imaging device 120 is hidden from the user 114 behind a screen 110. The initial position, and/or any subsequent positions, of the imaging device 120 may be altered. For example, the magnification of the imaging device 12 may be adjusted using a touchscreen of the screen 110, a button 140, and/or another suitable input. The imaging device 120 may also rotate to provide the user 114 with different perspectives. Rotation of the imaging device 120 may be done using electronic actuation and/or another suitable means. For example, the rotation of the imaging device 120 may be done by mounting the imaging device 120 to a servomotor. The controller 200 may automatically rotate the imaging device 120 or rotation may be a user 114 input. The user 114 input may be using a touchscreen of the screen 110, a button 140, and/or another suitable input.

At step 504, the controller 200 determines the eye-level height of the user 114. Determining the eye-level height may be performed using facial recognition or any suitable means; for example, segmenting the captured first image, detecting a facial landmark of the user 114, identifying one or more eyes based on the facial landmark, and determining the height of the eyes of the user 114. The eye-level height of the user 114 may also be tracked in real time, and the imaging device 120 may be moved to a new position based on the eye-level height of the user 114.

At step 506, the imaging device 120 moves to a second position from the first position based on the determined eye-level height of the user 114. The imaging device 120 may be moved by using a gear 136 and belt 138 system, in which the imaging device 120 is configured to interface with the belt 138. The controller 200 may cause the gear 136 to rotate, thus moving the belt 138 in response to the rotation of the gear 136 and causing the imaging device 120 to move in response to the movement of the belt 138. The movement of the imaging device 120 may be steadied by moving the imaging device 120 along a track 130 connected to the digital reversible mirror 100.

At step 508, the controller 200 causes the imaging device 120 to capture a second image of the user 114 at the eye-level height of the user 114.

At step 510, the captured second image is flipped along a vertical line of symmetry 112 to create a rendered mirrored image of the user 114. The vertical line of symmetry 112 may be a vertical axis of the imaging device 120. Optionally, the vertical line of symmetry 112 may be determined based on the user's 114 face (FIG. 1B). The vertical line of symmetry 112 of the user's 114 face may be determined using facial recognition software or another suitable means. For example, the controller 200 may segment the captured second image and recognize several facial landmarks of the user 114, such as one or more eyes, a nose, and/or a mouth, and may extrapolate from these landmarks a vertical line of symmetry 112 of the user's 114 face.

Finally, at step 512, the controller 200 causes the rendered mirrored image to be displayed on the screen 110. The user 114 may choose whether the image displayed on the screen 110 is mirrored. The user 114 may toggle between the original second image and the rendered mirrored image, which has been flipped along the vertical line of symmetry 112. This may be done through use of a touchscreen of the screen 110, a button 140, and/or another suitable input. The user 114 may alter the rendered mirrored image, such as rotating or magnifying the rendered mirrored image.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An apparatus for selectively displaying a reverse image of a user, comprising:
    a screen configured to display images, the screen including a plurality of quadrants;
    an array of imaging devices hidden behind the screen, wherein each imaging device of the array of imaging devices is disposed on a separate track and is located in a separate quadrant of the screen;
    a processor; and
    a memory including instructions stored thereon which, when executed by the processor, cause the apparatus to:
        capture a first image of the user using the array of imaging devices;
        determine an eye-level height of the user based on the captured first image;
        determine a quadrant of the plurality of quadrants in closest proximity to the determined eye-level height of the user to move the respective imaging device to the determined eye-level height of the user;

move the imaging device of the determined quadrant to the determined eye-level height of the user based on the determined quadrant and the determined eye-level height;

capture a second image of the user at the eye-level height of the user;

render a mirrored image of the second image based on a vertical axis of the imaging device of the determined quadrant; and display the rendered mirrored image on the screen.

2. The apparatus of claim 1, wherein the instructions, when executed by the processor, cause the apparatus to track the eye-level height of the user in real time.

3. The apparatus of claim 1, wherein the instructions, when executed by the processor, cause the apparatus to:

segment the first captured image;

detect a facial landmark of the user in the captured first image based on the segmentation;

identify one or more eyes in the first captured image based on the detected facial landmark; and determine the eye-level height of the user based on the identified one or more eyes.

4. The apparatus of claim 1, wherein the instructions, upon receiving an input, cause the rendered mirrored image to flip along the vertical axis of the imaging device in response to the input.

5. The apparatus of claim 1, further comprising a movement mechanism including:

a track configured to guide movement of the imaging device;

a gear configured to rotate; and a belt configured to mate with the gear and to move the imaging device along the track based on the rotation of the gear.

6. The apparatus of claim 1, wherein the imaging device is configured to rotate.

7. The apparatus of claim 1, wherein the imaging device is configured to zoom in and zoom out.

8. The apparatus of claim 1, wherein the screen includes a touchscreen.

9. A computer-implemented method for selectively displaying a reverse image of a user, comprising:

capturing a first image of a user with an array of imaging devices located behind a screen of a mirror device, the screen including a plurality of quadrants, wherein each imaging device of the array of imaging devices is located in a separate quadrant of the screen;

determining an eye-level height of the user based on the captured first image;

determining a quadrant of the plurality of quadrants in closest proximity to the determined eye-level height of the user to move the respective imaging device to the determined eye-level height of the user;

moving the imaging device of the determined quadrant to the determined eye-level height of the user;

capturing a second image of the user at the eye-level height of the user;

rendering a mirrored image of the second image based on a vertical axis of the imaging device of the determined quadrant; and displaying the rendered mirrored image on the screen.

10. The computer-implemented method of claim 9, further comprising:

tracking the eye-level height of the user in real time; and moving the imaging device to a position based on the tracked real-time eye-level height.

11. The computer-implemented method of claim 9, further comprising:

segmenting the first captured image;

detecting a facial landmark of the user in the captured first image based on the segmentation;

identifying one or more eyes in the first captured image based on the detected facial landmark; and determining the eye-level height of the user based on the identified one or more eyes.

12. The computer-implemented method of claim 9, further comprising:

receiving an input via a touch screen of the screen; and flipping the rendered mirrored image along the vertical axis of the imaging device in response to the input.

13. The computer-implemented method of claim 9, further comprising:

rotating a gear configured to mate with a belt of the mirror device;

moving the belt in response to rotating the gear;

moving the imaging device based on the movement of the belt; and guiding the movement of the imaging device along a track of the mirror device.

14. The computer-implemented method of claim 9, further comprising:

receiving an input; and adjusting a magnification of the imaging device in response to the input.

15. A non-transitory computer-readable medium storing instructions which, when executed by a processor, cause the processor to perform a computer-implemented method for selectively displaying a reverse image of a user, comprising:

capturing a first image of a user with an array of imaging devices an imaging device located behind a screen of a mirror device, the screen including a plurality of quadrants, wherein each imaging device of the array of imaging devices is located in a separate quadrant of the screen;

determining an eye-level height of the user based on the captured first image;

determining a quadrant of the plurality of quadrants in closest proximity to the determined eye-level height of the user to move the respective imaging device to the determined eye-level height of the user;

moving the imaging device of the determined quadrant to the determined eye-level height of the user;

capturing a second image of the user at the eye-level height of the user;

rendering a mirrored image of the second image based on a vertical axis of the imaging device of the determined quadrant; and displaying the rendered mirrored image on the screen.

16. The non-transitory computer-readable medium of claim 15, wherein the computer-implemented method further includes tracking the eye-level height of the user in real time.

17. The non-transitory computer-readable medium of claim 15, wherein the computer-implemented method further includes:

segmenting the first captured image;

detecting a facial landmark of the user in the captured first image based on the segmentation;

identifying one or more eyes in the first captured image based on the detected facial landmark; and determining the eye-level height of the user based on the identified one or more eyes.

18. The non-transitory computer-readable medium of claim 15, wherein the computer-implemented method further includes:
  receiving an input; and
  flipping the rendered mirrored image along the vertical axis of the imaging device in response to the input.

19. The non-transitory computer-readable medium of claim 15, wherein the computer-implemented method further includes:
  rotating a gear of the mirror device configured to mate with a belt of the mirror device;
  moving the belt in response to rotating the gear;
  moving the imaging device based on the movement of the belt; and
  guiding the movement of the imaging device along a track of the mirror device.

* * * * *